United States Patent Office 3,458,897
Patented Aug. 5, 1969

3,458,897
DEVICE FOR THE AUTOMATIC REMOVAL OF RIDGES FROM THE BOTTOM OF HOLLOW OBJECTS FORMED OF PLASTIC MATERIALS
Van Asbroeck Roger, Neerijse, Belgium, assignor, by mesne assignments, to Vypak Corporation, New York, N.Y., a corporation of New York
Filed June 1, 1966, Ser. No. 554,508
Claims priority, application Belgium, June 15, 1965, 665,432
Int. Cl. B29c 25/00; B26d 5/26
U.S. Cl. 18—5                              6 Claims

ABSTRACT OF THE DISCLOSURE

An apparatus for the automatic removal of ridges from the bottom of blow molded plastic containers. A knife is attached to a pivotable telescopic arm mounted on a portion of the mold. A cam arm section extends from the telescopic arm and contacts a cam surface causing the knife to traverse the closed surface at the bottom of the mold to cut the ridge from the bottom of the plastic container. A resilient means is provided for returning the knife to its initial position.

---

The present invention relates to a device for the automatic removal of ridges from the bottom of hollow objects formed of plastic material and obtained by blow molding.

In accordance with an extensively used technique for the production of hollow objects such as bottles from plastic material, one encloses in a two-part mold a section of a tubular parison which has been freshly extruded, and causes the expansion of this parison by the introduction thereinto of a fluid under pressure. The blowing is generally carried out by means of a nozzle introduced into that part of the parison which is to form the neck of the hollow object and, in this case, the other end of the parison is sealed by pinching at a point outside the closure of the two half molds. A result of this pinching is the appearance at the bottom of the molded hollow object of a ridge located in the plane of closure of the mold. This ridge can be detached manually after cooling and unmolding of the hollow object. However, this operation involves burdensome manual labor and it is therefore of interest, particularly from the economic viewpoint, to automate this operation, preferably by means of a simple mechanism.

Applicant has perfected a very simple and economical device which permits the automatic removal, before unmolding, of ridges from the bottom of hollow objects formed by blow molding.

In accordance with this invention, the device consists of a knife attached to a telescopic arm having a spring return mechanism, actuating means to actuate said arm, after completion of the blowing of the hollow object, in a rotational movement, causing the knife to traverse the closure surface at the bottom of the mold, contact being maintained by means of a spring, and means for returning said arm to its initial position upon completion of the movement of the knife along the surface of closure of the bottom of the mold.

In the use of the device of the invention, it is particularly advantageous to use molds whose bottom closure surface has a profile approaching that of the path of the knife. The ridge-removing device can be attached either to a part of the mold or to another part of the molding machine, and it can be controlled by any suitable means, for example, by a cam, a pneumatic or hydraulic piston, etc.

The spring effect for applying the knife to the closure surface of the mold during the ridge removal operation can be achieved in various ways. Thus, for example, one can attach the knife to a flexible and elastic support or to a telescoping spring-actuated support.

The device of the invention can readily be mounted on any type of blow-molding machine, for example, a machine with a fixed, rotating or reciprocating mold.

Moreover, the device in accordance with the invention is illustrated in detail by the embodiment presented below and which is especially designed to be mounted on a blow-molding machine with revolving molds. This type of machine comprises a series of molds mounted on a rotating support in such manner that the molds are positioned successively under an extrusion head from which a tubular parison is continuously discharged. A machine of this type is described, for example, in Belgian Patent No. 652,244.

However, it should be clearly understood that the above-described embodiment of the invention is given merely for illustrative purposes and that it is not intended to limit in any way the scope of the invention, since it is possible to cite, without exceeding the scope or the spirit of the invention, numerous modifications of the device of the invention which differ in detail.

In the following description, reference will be made to the attached drawings in which.

Figure 1:
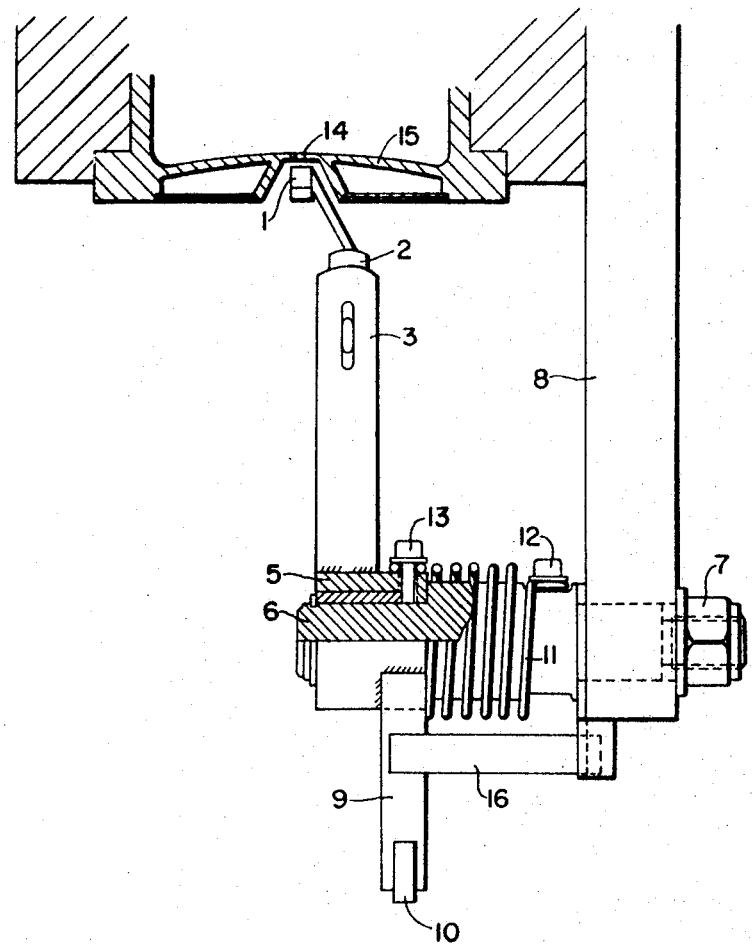
FIGURE 1 is an elevation view of an automatic ridge-removal device in accordance with the invention.
Figure 2:
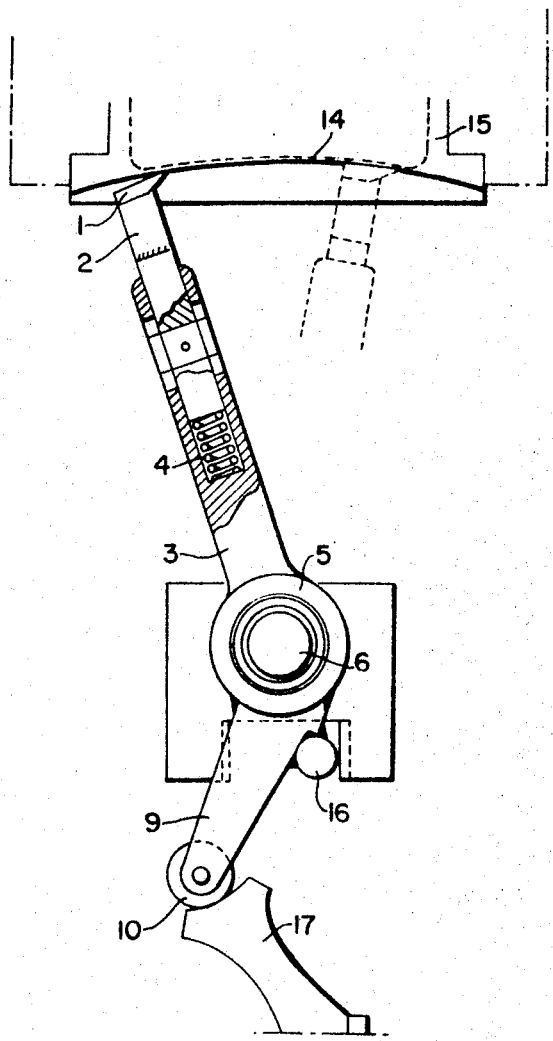
FIGURE 2 is a view of the same device depicted in FIGURE 1 after rotation 90 degrees to the right.

As appears from these figures, the ridge-removal device consists of a knife 1 supported by a means consisting of two arms 2 and 3 so arranged that they can only slide axially one inside the other. The upper arm 2 carrying the knife 1 is driven out of the lower arm by means of a spring 4 located at the bottom of the chamber in the lower arm 3. The lower arm 3 is attached to a mandrel 5 mounted in such manner as to turn about an axle 6 attached in its turn by means of a bolt 7 to the prolongation 8 of a mold-supporting plate. This mandrel 5 also carries a second arm 9 equipped at its end with an idler roller 10. The device also includes a helicoidal return spring 11 threaded on axle 6 and attached at its end to said axle 6 by a bolt 12 and at the other end to the mandrel 5 by a bolt 13. This spring is so designed that normally it maintains the equipment supporting knife 1 in the rest position, that is, in a position such that the knife 1 is at the left end (FIGURE 2) of the closure surface 14 of the bottom of the mold 15. In this position arm 9 is in contact with a stopping pin 16 attached to axle 6.

The device as described hereinabove is mounted under each mold of the molding machine and follows the latter during its revolution.

The device contains in addition a single cam 17 attached to a stationary part of the machine, for example, to the base. This cam, which collaborates with the arm 9 of each ridge-removal device, should be so located that when the arm 9 comes into contact with it the hollow object blown in the corresponding mold should be at that time in a thermal condition permitting removal of the ridge.

The operation of the ridge-removal device described above is very simple.

During the revolution of each mold, at a judiciously chosen point of its path, the idler roller 10 of arm 9 comes into contact with the fixed cam 17 and remains in contact therewith for a few moments. As the revolution of the mold continues, this action of retention causes the pivoting of mandrel 5, against the action of helical spring 11, around axle 6 and, on leaving the cam, the displacement of knife 1 along the closure surface 14 of the bottom of mold 15. During this displacement, knife 1 is held against the bottom of the mold by means of spring 4 and one thus obtains a clean and continuous cut-off of the bottom ridge. The profile of cam 17 is designed in such manner that roller 10 is freed at the moment when knife 1 has reached the right end (FIGURE 2) of the closure surface 14 of mold 15 and at this moment, under the return action of helicoidal spring 11, the equipment supporting knife 1 is returned to its initial position, that is, to the left end of closure surface 14 at the bottom of mold 15, and is thus ready to start a new ridge-removal cycle during the following passage of the mold. This return movement, moreover, is limited by the stopping pin 16.

Figure 3:
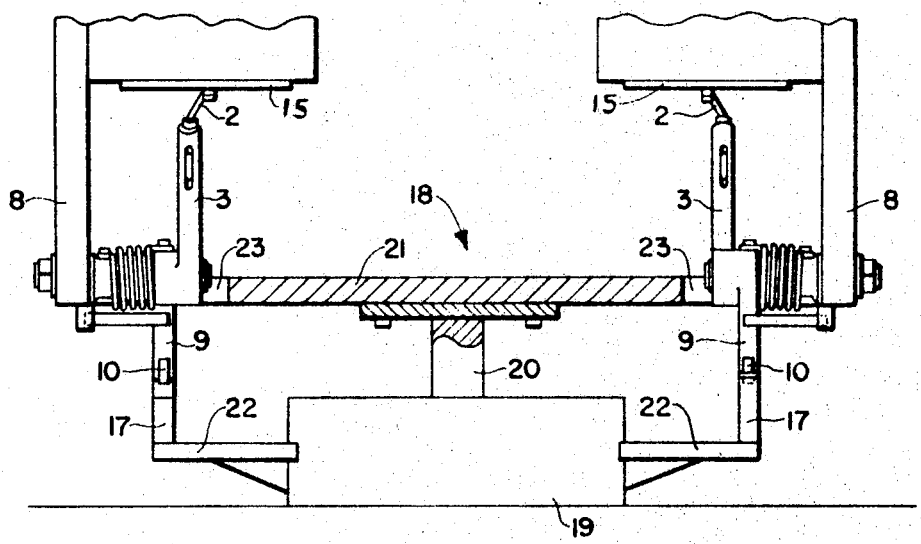
FIGURE 3 is an elevational view of a blow molding machine incorporating the automatic ridge removal device of the present invention.

Referring now to FIGURE 3, a blow molding machine, designated generally by the numeral 18, is shown equipped with the ridge removal device of the present invention. The machine is provided with a fixed base 19 having an upwardly extending rotatable shaft 20 carrying a circular rotatable table 21. The table supports by conventional means (not shown) a plurality of molds (only the bottom portion 15 being shown) having the prolongation 8 which supports the ridge removal device attached thereto. Projecting transversely from the fixed base 19 are a plurality of arms 22 which have attached to their outer ends the fixed cam 17 adapted to be contacted by the roller 10 carried at the lower end of arm 9. The ridge removal device is mounted so as to extend through a suitably shaped and sized opening 23 provided in the rotating table 21. The opening is so arranged to permit free rotation of arms 2, 3 and 9. While the exemplary blow molding machine described in reference to FIGURE 3 may be utilized in connection with the present ridge removal device, the device is equally adaptable to use with many other types of blow molding machines.

What is claimed is:
1. In an apparatus for blow molding hollow plastic objects, a device for the automatic removal of ridges from the bottom of the plastic object comprising:
 (a) a knife attached to a pivotable telescopic arm,
 (b) means to actuate said arm, after completion of the blowing of the container, in a rotational movement whereby said knife traverses the closed surface of the bottom of the mold while being pressed against this surface by resilient means; and
 (c) means for returning said arm to its initial position when said knife has ended its movement along the surface of the closure of the bottom of the mold.
2. In an apparatus for blow molding hollow plastic objects, a device for the automatic removal of ridges from the bottom of the plastic object in accordance with claim 1, wherein the rotational movement of said arm takes place around a fixed axis integral with the mold.
3. In an apparatus for blow molding hollow plastic objects, a device for the automatic removal of ridges from the bottom of the plastic object in accordance with claim 1, wherein the return of said arm to its initial position is obtained by means of a return spring and is limited by a stopping pin.
4. In an apparatus for blow molding hollow plastic objects, a device for the automatic removal of ridges from the bottom of the plastic object in accordance with claim 1, wherein the closure surface of the bottom of the mold has the contour of an arc of a circle.
5. In an apparatus having a mold for blow molding hollow plastic objects, a device for the automatic removal of ridges from the bottom of the plastic object comprising:
 (a) a fixed axle positioned under and attached to said mold;
 (b) a telescopic arm pivoting on said axle;
 (c) a knife attached to the end of said arm whereby said knife traverses the closure surface of the bottom of said mold during the pivoting of said arm;
 (d) a second arm integral with said first arm controlling the pivoting of said first arm after completion of the blowing of the hollow plastic object in said mold;
 (e) a return spring for returning the device at the end of its motion to its initial position; and
 (f) a fixed stopping pin limiting the return movement of said device.
6. In an apparatus having a plurality of molds for blow molding hollow plastic objects, a device for the automatic removal of ridges from the bottom of the plastic object comprising:
 (a) means to mount said device on each of said molds;
 (b) a fixed axle mounted on said mounting means;
 (c) a telescopic arm pivoting on said fixed axle;
 (d) a knife attached to the end of said arm in such a manner as to traverse the closure surface of the bottom of the mold during pivoting of said arm;
 (e) a second arm integral with said first arm and controlling the pivoting of the latter by means of a fixed cam mounted on the chassis of said blow molding apparatus,
  (i) said fixed cam positioned in the path described by said second arm and so placed that when said arm comes into contact with said cam said hollow plastic object in the corresponding mold is in the optimum condition with respect to ridge removal;
 (f) a return spring for returning said first arm to its initial position as soon as said second arm is freed from the said fixed cam; and
 (g) a stopping pin to limit the return movement of said first arm.

References Cited
UNITED STATES PATENTS

| | | | |
|---|---|---|---|
| 613,322 | 11/1898 | Schuerman | 83—612 X |
| 2,975,265 | 3/1961 | Kaiser et al. | 83—914 X |

FOREIGN PATENTS 559,359  10/1957  Belgium.

WILBUR L. McBAY, Primary Examiner

U.S. Cl. X.R.

83—582, 589, 914